United States Patent
Lins De Medeiros et al.

(10) Patent No.: US 12,445,891 B2
(45) Date of Patent: Oct. 14, 2025

(54) METHODS, SYSTEMS AND BASEBAND UNITS FOR IMPROVED USAGE OF SHARED FRONTHAUL CONNECTIONS

(71) Applicant: Telefonaktiebolaget LM Ericsson (publ), Stockholm (SE)

(72) Inventors: Eduardo Lins De Medeiros, Bromma (SE); Andre Mendes Cavalcante, Indaiatuba SP (BR); Igor Almeida, Indaiatuba SP (BR)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 473 days.

(21) Appl. No.: 17/779,617

(22) PCT Filed: Dec. 6, 2019

(86) PCT No.: PCT/SE2019/051239
§ 371 (c)(1),
(2) Date: May 25, 2022

(87) PCT Pub. No.: WO2021/112730
PCT Pub. Date: Jun. 10, 2021

(65) Prior Publication Data
US 2023/0022964 A1    Jan. 26, 2023

(51) Int. Cl.
*H04W 28/02* (2009.01)
*H04W 28/16* (2009.01)

(52) U.S. Cl.
CPC ....... *H04W 28/0231* (2013.01); *H04W 28/16* (2013.01)

(58) Field of Classification Search
None
See application file for complete search history.

(56) References Cited

U.S. PATENT DOCUMENTS 10,772,060 B2 *  9/2020  Mayer ............... H04W 56/0015
2009/0232059 A1 *  9/2009  Sundberg ............. H04W 76/15
                                                             370/329

(Continued)

FOREIGN PATENT DOCUMENTS

EP          2739105 A1      6/2014
WO    WO-2017152713 A1 *   9/2017 ............ H04W 16/10
WO       2019154507 A1     8/2019

OTHER PUBLICATIONS

International Search Report and Written Opinion dated Nov. 3, 2020 for International Application No. PCT/SE2019/051239 filed Dec. 6, 2019, consisting of 11-pages.

(Continued)

*Primary Examiner* — Luna Weissberger
(74) *Attorney, Agent, or Firm* — Weisberg I.P. Law, P.A.

(57) ABSTRACT

A method performed by a system having a plurality of base station systems, each base station system comprising a baseband unit, BBU and a radio unit, RU interconnected via a fronthaul connection that is shared between the base station systems. Fronthaul capacity information on transmission capacity of the shared fronthaul connection and information on required capacity for transmission and/or reception of wireless signals by the RU of the respective base station system are obtained. Time unit transmission restrictions for the respective base station system is determined based on the fronthaul capacity information and on the information on required capacity, which time unit transmission restrictions results in fronthaul usage below the transmission capacity of the part of the fronthaul connection. Information on the determined time unit transmission restrictions is sent to the BBU of the respective base station system.

17 Claims, 6 Drawing Sheets

(56) References Cited

U.S. PATENT DOCUMENTS

| | | | |
|---|---|---|---|
| 2018/0287696 A1* | 10/2018 | Barbieri | H04W 36/08 |
| 2018/0310199 A1 | 10/2018 | Halabian et al. | |
| 2019/0273641 A1 | 9/2019 | Cavalcante et al. | |
| 2019/0281501 A1 | 9/2019 | Berg et al. | |
| 2019/0357232 A1* | 11/2019 | Raghothaman | H04L 5/0048 |

OTHER PUBLICATIONS

Erik Dahlman et al.; Time-Division Duplex (TDD); 5G NR: The Next Generation Wireless Access Technology; Chapter 7: Duplex Schemes; Academic Press; 2018, consisting of 4-pages.

ECC Report 296; National synchronization regulatory framework options in 3400-3800 MHZ: a toolbox for coexistence of MFCNs in synchronised, unsynchronised and semi-synchronised operation in 3400-3800 MHZ; Electronic Communications Committee; Mar. 2019, consisting of 137-pages.

ECPRI Specification V2.0; Common Public Radio Interface: eCPRI Interface Specification; May 10, 2019, consisting of 109-pages.

O-RAN Fronthaul Working Group Control, User and Synchronization Plane Specification; ORAN-WG4.CUS.0-v01.00 Technical Specification; O-RAN Alliance; 2019, consisting of 189-pages.

3GPP TS 38.213 V15.6.0; 3rd Generation Partnership Project; Technical Specification Group Radio Access Network; NR; Physical layer procedures for control (Release 15); Jun. 2019, consisting of 107-pages.

3GPP TS 38.331 V15.6.0; 3rd Generation Partnership Project; Technical Specification Group Radio Access Network; NR; Radio Resource Control (RRC) protocol specification (Release 15); Jun. 2019, consisting of 519-pages.

European Search Report dated Jul. 18, 2023 for Application No. 19954805.8, consisting of 10 pages.

Younis et al. "Energy-Efficient Resource Allocation in C-RANs with Capacity-Limited Fronthaul"; IEEE Transactions on Mobile Computing, vol. 20 No. 2, pp. 473-487, Feb. 2021, consisting of 15 pages.

* cited by examiner

METHODS, SYSTEMS AND BASEBAND UNITS FOR IMPROVED USAGE OF SHARED FRONTHAUL CONNECTIONS

CROSS-REFERENCE TO RELATED APPLICATION

This application is a Submission Under 35 U.S.C. § 371 for U.S. National Stage Patent Application of International Application Number: PCT/SE2019/051239, filed Dec. 6, 2019 entitled "METHODS, SYSTEMS AND BASEBAND UNITS FOR IMPROVED USAGE OF SHARED FRONTHAUL CONNECTIONS," the entirety of which is incorporated herein by reference.

TECHNICAL FIELD

The present disclosure relates generally to methods, systems and baseband units for improved usage of shared fronthaul connections. More specifically, it relates to shared fronthaul connections in wireless communication networks comprising a plurality of base station systems where each base station system comprises a baseband unit (BBU), and a radio unit (RU) interconnected via such a fronthaul connection, where the RUs are arranged to transmit wireless signals to, and receive from, wireless communication devices. The present disclosure further relates to computer programs and carriers corresponding to the above methods, systems and BBUs.

BACKGROUND

In a base station system, aka distributed base station system, aka centralized radio access network (C-RAN) of a wireless communication network, radio access network (RAN) processing is conducted by at least two separate units: a radio unit (RU), and a base band unit (BBU). The BBU is connected to the RU via a fronthaul connection. The fronthaul connection may also be called a fronthaul link. The BBU may also be called a Digital Unit (DU). The RU may also be called Remote Radio Unit (RRU). The RU is connected to one or more antennas through which the RU wirelessly communicates with at least one wireless communication device situated in a geographical cell area to which the RU provides wireless communication coverage. The BBU is in its turn connected to other base station systems or base stations, and to a core network of a wireless communication system. The BBU can be centralized and there may be more than one RU connected to each BBU. Traditionally, the BBU performs advanced radio coordination features such as joint detection, joint decoding, coordinated multi-point transmission (CoMP), to increase the spectrum efficiency and network capacity, as well as baseband signal processing, whereas the RU performs radio frequency (RF) processing and transmission/reception of the RF processed signals. However, in some applications, the RU may also perform some of the signal processing normally performed in the BBU, such as Fast Fourier Transformation (FFT).

In future 5G deployments of base station systems, the fronthaul connection between BBU and RU will be packet-based, carrying time-sensitive Long Term Evolution (LTE) or New Radio (NR) physical layer data. Furthermore, the fronthaul connection may be realized as a point-to-point link or as a network. Fronthaul connection utilization will fluctuate with the number of wireless communication devices being served. Furthermore, a fronthaul connection may be shared between multiple base station systems. If the base station systems sharing a fronthaul connection are uncoordinated and the fronthaul connection is not dimensioned for simultaneous peak rates, this might lead to unacceptable queueing or packet losses that have detrimental effect over radio performance.

Due to the time sensitivity requirements and high capacity requirements, one straightforward approach for deployment is isolating fronthaul traffic in a fronthaul network. Throughout this disclosure, it is assumed that such a fronthaul network is used exclusively for fronthaul traffic, e.g. traffic originating from e.g. BBUs, RUs, radio heads, timing providers, etc.

In networked fronthaul deployments supporting New Radio—Time Division Duplex (NR-TDD), traffic generated by synchronized nodes will have a periodicity similar to that of the air interface. That is to say, traffic on the fronthaul connection might show a TDD pattern where links of the fronthaul connection essentially are utilized in half-duplex mode even when signals are aggregated.

Ideally, fronthaul networks should be dimensioned such that they do not severely limit peak rates over the air, but still are reasonably utilized during the day. If there is over-dimensioning, Capital Expenses (CAPEX) will be high due to the cost of optical transceivers, switching equipment such as electrical and optical equipment, and fiber e.g. cost of ports and trenching. Additionally, due to demand fluctuation, over-dimensioning might also contribute to higher Operating Expenses (OPEX) when the extra links will be under-utilized, due to e.g. power cost and dark fiber rental cost.

Prior art approaches for sharing of fronthaul infrastructure/connections include dimensioning the shared fronthaul connection for peak rate, relying on packet marking/dropping executed by intermediate nodes, e.g. switches of a fronthaul network, enforcing rate limitations in outbound interface of the intermediate nodes (queueing disciplines) among many others. Solutions that depend only on base station system nodes, i.e. BBU and RU, include the coordination of scheduling decisions for each Transmission Time Interval (TTI) between base station system nodes that share the same fronthaul infrastructure. In this scheme, schedulers of such radio nodes would, in coordinated fashion, avoid distributing assignments/grants above a threshold so as not to surpass limitations in the fronthaul links.

Most of the approaches based only on intermediate nodes have the drawback of depending on dropping or delaying packets for certain flows. Packet drops cause unpredictable radio performance degradation, leading to over-the-air retransmissions, i.e. between the RU and its UEs, and may interfere with link adaptation algorithms; for example, drops in fronthaul may cause retransmissions even for very good radio channel conditions. The acceptable delays over the fronthaul connection are very strict, so solutions that depend on traffic shaping are also not viable.

Solutions that rely on coordination of scheduling decisions for each TTI may avoid problems with packet drops and make the fronthaul capacity constraints transparent to the base station system but require a high number of messages passing between the radio nodes. Consequently, there is a need for an improved way of sharing fronthaul connections.

SUMMARY

It is an object of the invention to address at least some of the problems and issues outlined above. It is possible to achieve these objects and others by using methods, systems and BBUs as defined in the attached independent claims.

According to one aspect, a method is provided performed by a system related to a wireless communication network comprising a plurality of base station systems, each base station system comprising a BBU and an RU interconnected via a fronthaul connection. The RUs are arranged to transmit wireless signals to, and receive from, wireless communication devices. The method comprises obtaining fronthaul capacity information on transmission capacity of a part of the fronthaul connection that is shared by a first base station system and a second base station system of the plurality of base station systems, and obtaining information on required capacity for transmission and/or reception of wireless signals by the RU of the first base station system and by the RU of the second base station system towards and/or from the wireless communication devices. The method further comprises determining time unit transmission restrictions for the first base station system and for the second base station system based on the obtained fronthaul capacity information and on the obtained information on required capacity, which time unit transmission restrictions results in fronthaul usage below the transmission capacity of the part of the fronthaul connection, and sending information on the determined time unit transmission restrictions for the first base station system to the BBU of the first base station system and information on the determined time unit transmission restrictions for the second base station system to the BBU of the second base station system.

According to another aspect, a method is provided performed by a BBU of a first base station system of a wireless communication network. The first base station system further comprises an RU. The wireless communication network further comprises a second base station system comprising an RU and a BBU. The BBUs and the RUs of each of the first and second base station system are interconnected via a fronthaul connection, which is shared by the first and the second base station system. The method comprises receiving, from a system related to the wireless communication network, information on time unit transmission restrictions for the first base station system, the time unit transmission restrictions being determined based on fronthaul capacity information on the shared fronthaul connection and on information on required capacity for transmission and/or reception of wireless signals by the RU of the first base station system and by the RU of the second base station system. The method further comprises allocating transmission resources according to the information on time unit transmission restrictions, and triggering communication of signals over the allocated transmission resources with wireless communication devices connected to the RU of the first base station system, according to the allocation.

According to another aspect, a system is provided that is operable with a wireless communication network comprising a plurality of base station systems. Each base station system comprises a BBU and an RU interconnected via a fronthaul connection. The RUs are arranged to transmit wireless signals to, and receive from, wireless communication devices. The system comprises a processing circuitry and a memory. Said memory contains instructions executable by said processing circuitry, whereby the system is operative for obtaining fronthaul capacity information on transmission capacity of a part of the fronthaul connection that is shared by a first base station system and a second base station system of the plurality of base station systems, and obtaining information on required capacity for transmission and/or reception of wireless signals by the RU of the first base station system and by the RU of the second base station system towards and/or from the wireless communication devices. The system is further operative for determining time unit transmission restrictions for the first base station system and for the second base station system based on the obtained fronthaul capacity information and on the obtained information on required capacity, which time unit transmission restrictions results in fronthaul usage below the transmission capacity of the part of the fronthaul connection, and sending information on the determined time unit transmission restrictions for the first base station system to the BBU of the first base station system and information on the determined time unit transmission restrictions for the second base station system to the BBU of the second base station system.

According to another aspect, a BBU is provided that is operable in a first base station system of a wireless communication network, the first base station system further comprising an RU. Further, the wireless communication network comprises a second base station system comprising an RU and a BBU. The BBUs and the RUs of each base station system are interconnected via a fronthaul connection. The fronthaul connection is shared by the first and the second base station system. The BBU comprises a processing circuitry and a memory. Said memory contains instructions executable by said processing circuitry, whereby the BBU is operative for receiving, from a system related to the wireless communication network, information on time unit transmission restrictions for the first base station system, the time unit transmission restrictions being determined based on fronthaul capacity information on the shared fronthaul connection and on information on required capacity for transmission and/or reception of wireless signals by the RU of the first base station system and by the RU of the second base station system. The BBU is further operative for allocating transmission resources according to the information on time unit transmission restrictions and for triggering communication of signals over the allocated transmission resources with wireless communication devices connected to the RU of the first base station system, according to the allocation.

According to other aspects, computer programs and carriers are also provided, the details of which will be described in the claims and the detailed description.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to control the transmission of data over a fronthaul connection shared by two or more base station systems. According to an embodiment, this is achieved by a system coordinating transmission over the shared fronthaul for the base station systems sharing the fronthaul connection. The system obtains information on transmission capacity on the shared fronthaul and obtains information on required capacity for communication of wireless signals by the RUs of the base station systems sharing fronthaul connection. Based on this information the system determines any necessary transmission restrictions on the base station systems and communicates any necessary transmission restrictions, to schedulers of the BBUs of the involved base station systems. The BBUs then allocate transmission resources according to their respective restriction, and possibly also to according to a harmonized transmission scheme for avoiding interference. Hereby, dynamic sharing of fronthaul resources is achieved with low message exchange between the involved base station systems, and also it is not necessary to keep track of fronthaul state in the schedulers.

Figure 1:
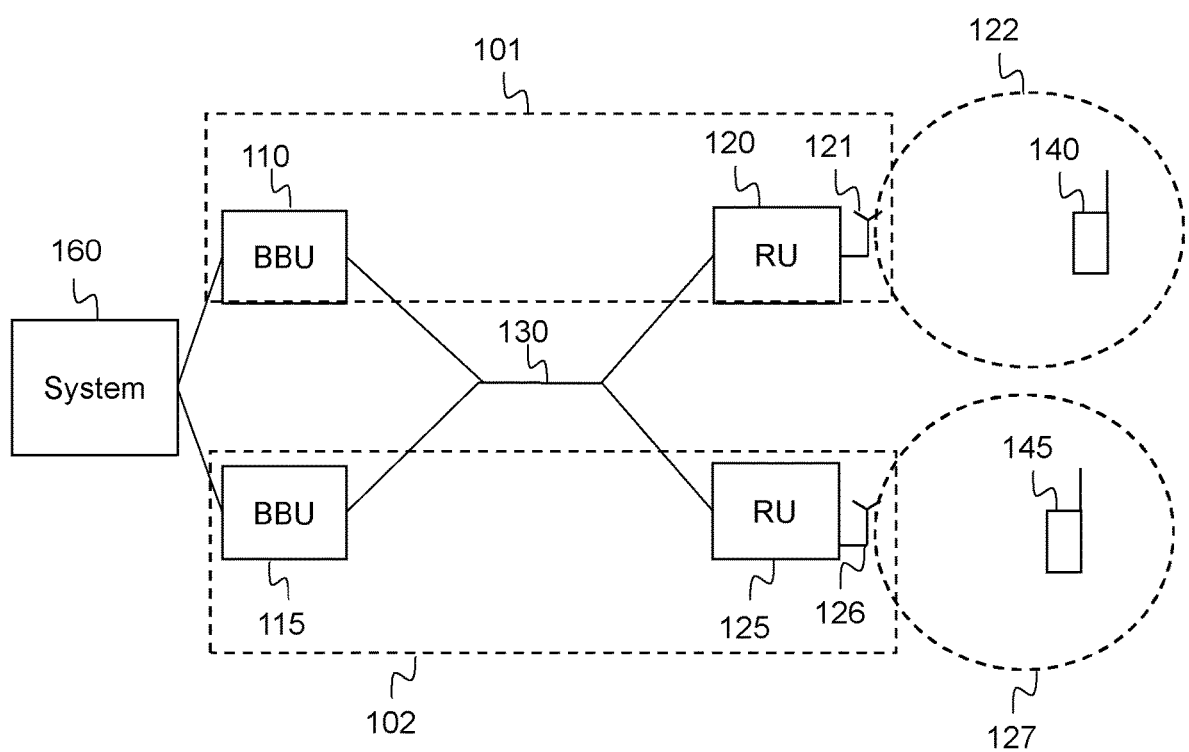
FIG. 1 is a block diagram illustrating a fronthaul configuration of a communication network in which the present invention may be used.

FIG. 1 illustrates a wireless communication network in which the present invention may be used. The wireless communication network comprises a first base station system 101, which comprises a BBU 110 and an RU 120. The BBU 110 has connections to other base station nodes or other radio access network (RAN) nodes and further to a core network so that the distributed base station system can communicate to other nodes of the communication network. The BBU 110 is connected with the RU 120 via a fronthaul connection 130. The fronthaul connection 130 may be any kind of connection, such as a dedicated wireline or wireless connection or a network connection, e.g. an Ethernet network. The RU 120 further has at least one antenna 121 through which wireless signals are communicated towards and from one or more wireless communication devices 140. The wireless signals comprise data to be communicated from or to the wireless communication devices 140. The wireless communication network further comprises a second base station 102, which also comprises a BBU 115 and an RU 125, which has the same function as described above for the BBU 110 and the RU 120 of the first base station system 101. The BBU 115 and the RU 125 of the second base station system 102 are interconnected via the same fronthaul connection 130 as the first base station system 101. In other words, the fronthaul connection 130 is shared between the first and second base station system 101, 102. Further, there is provided a system 160 that coordinates the usage of the shared fronthaul connection between the first and the second base station system. There may be more than two base station systems that share a fronthaul connection and the system may coordinate usage of the shared fronthaul connection for more than two base station systems. The system 160 is connected to the BBU 110, 115 of the respective first and second base station system 101, 102.

Further, the RU 120 of the first base station system 101 provides radio communication coverage to wireless communication devices 140 situated within a first geographical cell area 122. In a similar way, the RU 125 of the second base station system 102 provides radio communication coverage to wireless communication devices 145 situated within a second geographical cell area 127, by sending and receiving wireless signals from and to its antenna(s) 126.

The wireless communication network in which the first and second base station systems 101, 102 are situated may be any kind of wireless communication network that can provide radio access to wireless communication devices. Example of such wireless communication networks are Long Term Evolution (LTE), LTE Advanced, as well as fifth generation wireless communication networks based on technology such as New Radio (NR).

The wireless communication devices 140, 145 may be any type of device capable of wirelessly communicating with an RU 120, 125 using radio signals. For example, the wireless communication device 140, 145 may be a User Equipment (UE), a machine type UE or a UE capable of machine to machine (M2M) communication, a sensor, a tablet, a mobile terminal, a smart phone, a laptop embedded equipped (LEE), a laptop mounted equipment (LME), a USB dongle, a Customer Premises Equipment (CPE) etc.

Figure 2:
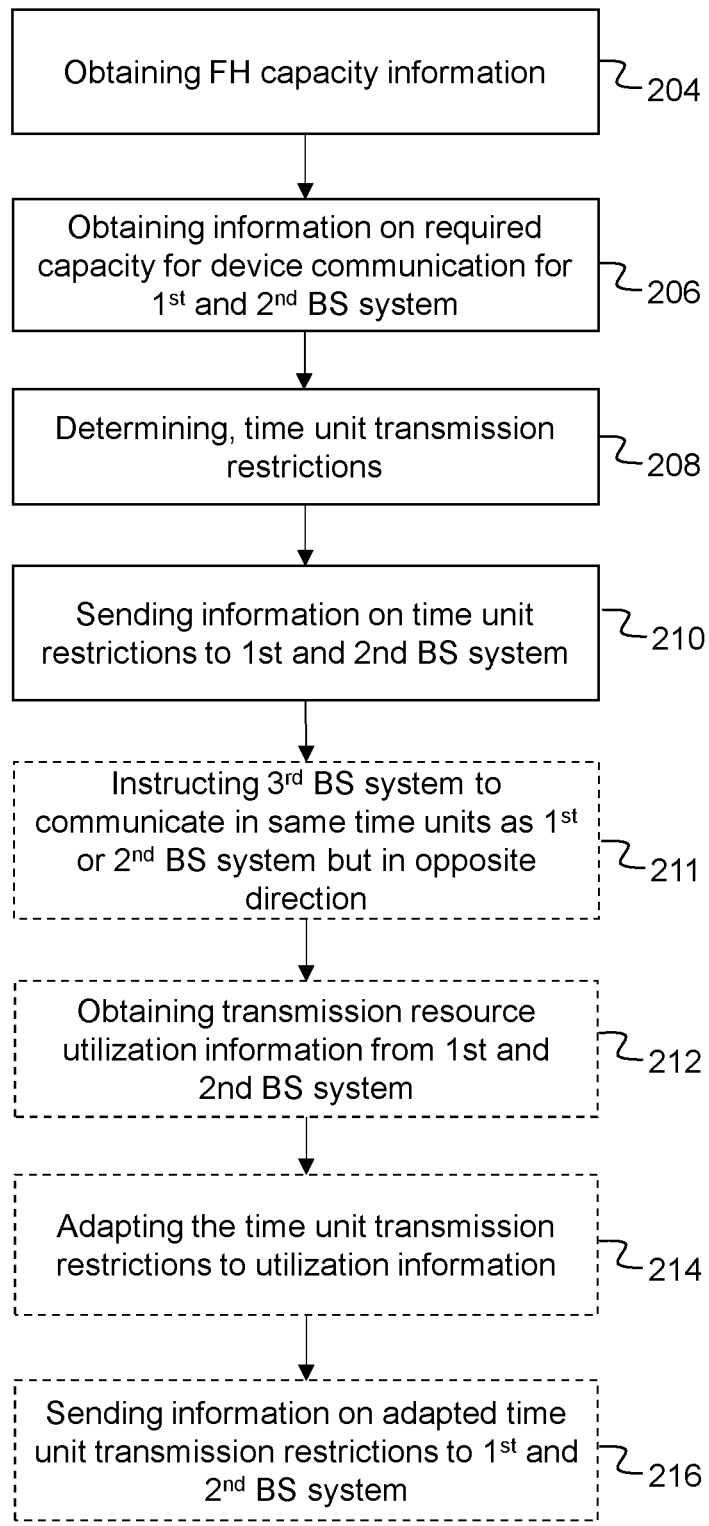
FIG. 2 is a flow chart illustrating a method performed by a system, according to possible embodiments.

FIG. 2, in conjunction with FIG. 1, describes a method performed by a system 160 related to a wireless communication network comprising a plurality of base station systems 101, 102, each base station system comprising a BBU 110, 115 and an RU 120, 125 interconnected via a fronthaul connection. The RUs 120, 125 are arranged to transmit wireless signals to, and receive from, wireless communication devices 140, 145. The method comprises obtaining 204 fronthaul capacity information on transmission capacity of a part of the fronthaul connection 130 that is shared by a first base station system 101 and a second base station system 102 of the plurality of base station systems, and obtaining 206 information on required capacity for transmission and/or reception of wireless signals by the RU 120 of the first base station system 101 and by the RU 125 of the second base station system 102 towards and/or from the wireless communication devices 140, 145. The method further comprises determining 208 time unit transmission restrictions for the first base station system 101 and for the second base station system 102 based on the obtained 204 fronthaul capacity information and on the obtained 206 information on required capacity, which time unit transmission restrictions results in fronthaul usage below the transmission capacity of the part of the fronthaul connection, and sending 210 information on the determined time unit transmission restrictions for the first base station system to the BBU of the first base station system and information on the determined time unit transmission restrictions for the second base station system to the BBU of the second base station system.

The system performing the method described in FIG. 2 may be called a fronthaul controller. The system could be situated anywhere inside or outside the wireless communication network. According to one embodiment, the system is situated close to any of the BBUs, or even in one of the BBUs in order to be able to perform fast instructions. Alternatively, the system performing the method may be a group of network nodes, wherein functionality for performing the method are spread out over different physical, or virtual, nodes of the network, a so called cloud-solution. That the first and second base station systems 101, 102 share at least a part of the fronthaul connection signifies that signals between the BBU and the RU of the base station systems are sent at least partly over the same fronthaul connection. The obtained information could be configuration information stored in the system, e.g. since the wireless communication network was last configured. Alternatively, it could be information that the system obtains from another node, e.g. of the wireless communication network. The part of the fronthaul connection that is shared may be the whole fronthaul connection or only a part of it. The term "time unit transmission restrictions" may also be called "time unit transmission resource restrictions" in order to point out that it deals with restrictions for using time unit transmission resources. The time unit transmission resources may be time slots or symbols of time slots, e.g. in a transmission scheme for wireless transmission of signals. In the embodiment where the time unit transmission resources are time slots, the time unit transmission restrictions may be called slot format restrictions. The transmission scheme used may be Time division duplex (TDD) or half-duplex frequency division duplex (FDD) for transmission over the air between the RU and the UEs. The time unit transmission restrictions may be the same or different for the first base station system and the second base station system. The information on determined time unit transmission restrictions are sent to a scheduler of the respective BBU. In case the system that performs the method is situated in one of the BBUs, the information regarding this BBU is sent internally in this BBU from its system to its scheduler.

The scheduler of the respective BBU then refrains from including any downlink (DL) transmissions in the DL time units that are restricted. For uplink (UL) transmissions, according to one embodiment, it is beneficial but not mandatory that the RU is instructed by the system, possibly via the scheduler of the same base station system, to NOT send any UL data in the restricted UL time units back to the BBU, since the scheduler has no use for them and since the FH resources are saved. Further, according to another embodiment, the BBU would not send any scheduling grants towards the RU for the uplink (UL) time units that are restricted.

The time unit transmission restrictions may comprise information for each time unit whether it can be used for sending data or not. Alternatively, the time unit transmission restrictions only comprise information for which time units no data is to be sent. Still alternatively, the information may be for each time unit, e.g. whether the time unit is scheduled as an UL time unit, a DL time unit or a time unit in which no data is to be sent.

Hereby, an efficient way is provided for optimizing utilization of a fronthaul connection that is shared between two or more base station systems. Further, the embodiment can be implemented without needing to introduce awareness of fronthaul constraints into the scheduling entity of each BBU. Instead such awareness only needs to be introduced into the system performing this method. Once the time unit transmission restrictions have been determined and sent to each BBU, the scheduler of each BBU can operate as usual, within those restrictions. Further, the proposed method can be implemented in regular NR signaling, i.e. control channels and interfaces, to enable coordination between base station systems sharing a fronthaul connection. Also, once a feasible combination of slot format restrictions for involved base station systems is defined, the slot format restrictions can be fine-tuned to track parameters such as cell resource utilization, giving fronthaul resources to base station systems according to need.

According to an embodiment, the determined 208 time unit transmission restrictions comprises a first mask defining at which time units no data is to be sent between the BBU 110 of the first base station system 101 and its RU 120 and a second mask defining at which time units no data is to be sent between the BBU 115 of the second base station system 102 and its RU 125. Further, the information sent 210 to the BBU 110 of the first base station system 101 is the first mask and the information sent to the BBU 115 of the second base station system 102 is the second mask.

By determining such masks defining time units when no data is to be sent, based on required transmission capacity and fronthaul capacity, the amount of data sent can be controlled to be below the fronthaul capacity. Also, by determining such masks, the masks could be overlaid onto already existing harmonized transmission schemes for uplink and downlink transmission so that the limited transmission fits well with the harmonized transmission schemes.

According to another embodiment, the method further comprises, for time units that are configured as uplink time units: initiating sending of the determined time unit transmission restrictions for the first base station system to the RU 120 of the first base station system 101, and initiating sending of the determined time unit transmission restrictions for the second base station system to the RU 125 of the second base station system 102. By sending the time unit transmission restrictions to the RUs regarding the restrictions that have influence on time units that are configured into UL time units, the RU can act on such transmission restrictions and not send any data in the uplink direction towards its BBU during the uplink time resource that has a restriction.

According to another embodiment, the time unit transmission restrictions defines for which uplink time units no grants are to be distributed by the BBU 110 of the first base station system 101 towards its RU 120 and for which uplink time units no grants are to be distributed by the BBU 115 of the second base station system 102 towards its RU 125. A grant, aka scheduling grant, is a permission for a UE to transmit at a certain time unit. In this embodiment, the system instructs the BBU not to send any grants to its UEs regarding the uplink time units that are restricted. Hereby, there will be no data sent in the uplink by the UEs in the restricted time units.

According to another embodiment, the time unit transmission restrictions for the first base stations system 101 and the time unit transmission restrictions for the second base station system 102 are mutually distributed so that available transmission resources for the first base station system and available transmission resources for the second base station system are proportional to the required capacity for transmission and/or reception of wireless signals by the first base station system 101 and the required capacity for transmission and/or reception of wireless signals by the second base station system 102. Hereby, a fairness of transmission restrictions are achieved between the base station systems sharing a fronthaul connection.

According to another embodiment, the method further comprises: obtaining 212 information on utilization of transmission resources of the first base station system and information on utilization of transmission resources of the second base station system when the determined time unit restrictions of the first and the second base station system are used. the method further comprises adapting 214 the determined 210 time unit transmission restrictions of the first base station system and the time unit transmission restrictions of the second base station system to the obtained 212 information on utilization of transmission resources of the first base station system and information on utilization of transmission resources of the second base station system, and sending 216 information on the respective adapted time unit transmission restriction to the respective one of the first and the second base station system. Hereby, an improved usage of the existing transmission resources is achieved, as the usage is adapted to the current situation. The obtaining of information of utilization and the adapting of time unit restrictions may be performed periodically or when triggered, such as when utilization of the transmission resources drops, e.g. below a threshold. The obtaining of information of utilization can be determined by each base station system separately and reported to the system related to the wireless communication network.

According to another embodiment, also a third base station system shares the part of the fronthaul connection 130. Further, the first and the second base station systems 101, 102 communicate over a first carrier frequency band and the third base station system communicate over a second carrier frequency band that is different from the first carrier frequency band. Also, the method further comprises instructing 211 the third base station system to communicate signals with its wireless communication devices in the same time units as signals are communicated by the first base station system or the second base station system but in an opposite direction as a direction in which the signals are communicated by the first base station system or the second base station system. Signals of the third base station system can coexist with signals of the first and second base station system as they use another frequency and therefore different transmission resources as the first and second base stations. "An opposite direction as a direction in which the signals are communicated by the first base station system and the second base station system" means that it the first or second base station system is sending signals downlink in a time unit, the third base station system sends signals uplink in the same time unit.

Figure 3:
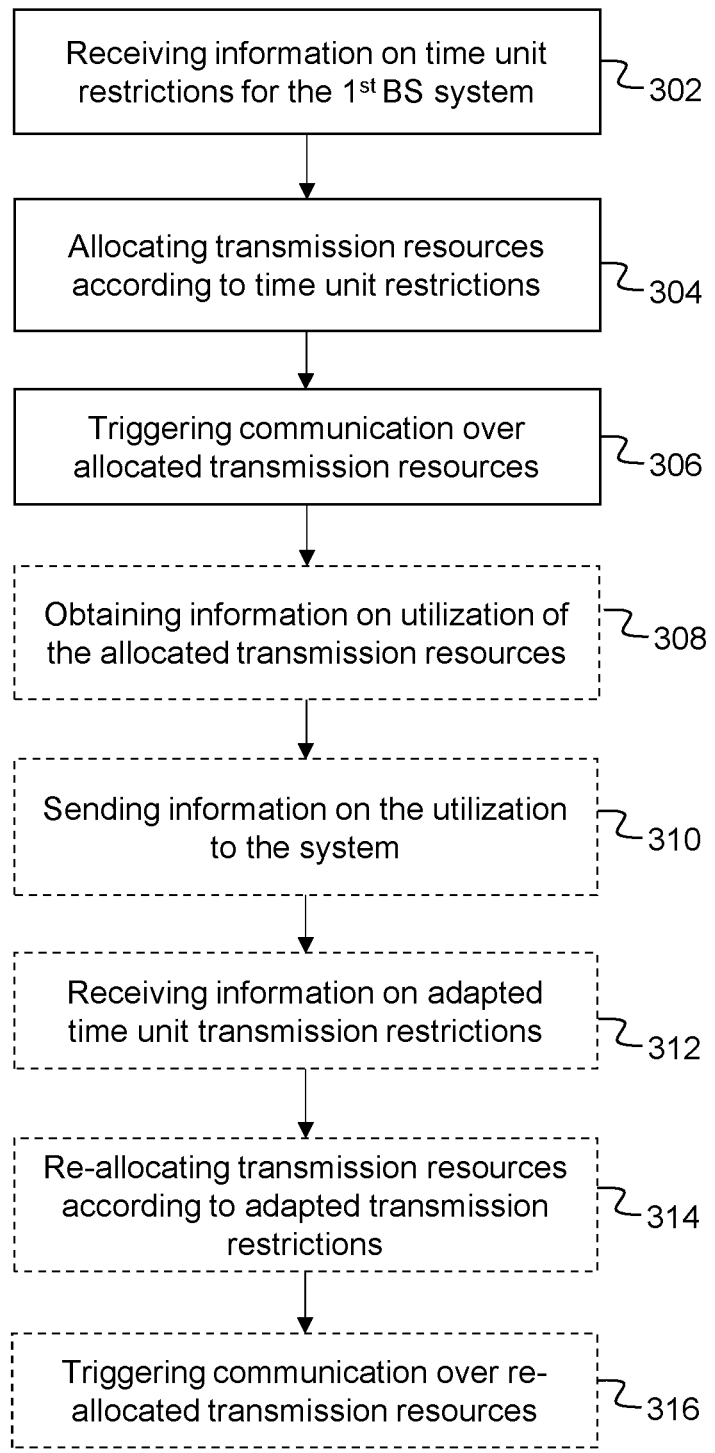
FIG. 3 is a flow chart illustrating a method performed by a BBU, according to possible embodiments.

FIG. 3, in conjunction with FIG. 1 describes a method performed by a BBU 110 of a first base station system 101 of a wireless communication network. The first base station system 101 further comprises an RU 120. The wireless communication network further comprises a second base station system 102 comprising an RU and a BBU. The BBUs and the RUs of each of the first and second base station system are interconnected via a fronthaul connection 130, which is shared by the first and the second base station system 101, 102. The method comprises receiving 302, from a system 160 related to the wireless communication network, information on time unit transmission restrictions for the first base station system 101, the time unit transmission restrictions being determined based on fronthaul capacity information on the shared fronthaul connection and on information on required capacity for transmission and/or reception of wireless signals by the RU 120 of the first base station system 101 and by the RU 125 of the second base station system 102. The method further comprises allocating 304 transmission resources according to the information on time unit transmission restrictions, and triggering 306 communication of signals over the allocated transmission resources with wireless communication devices 140 connected to the RU of the first base station system 101, according to the allocation. Hereby, the BBU, especially a scheduler of the BBU just needs to follow received time unit transmission restrictions and does not need to have control itself of any fronthaul capacity limitations and does not have to coordinate usage of such resources with other base station systems sharing the fronthaul connection.

According to an embodiment, the information on time unit transmission restrictions comprises a first mask defining at which time units no data is to be sent between the BBU 110 of the first base station system 101 and its RU 120.

According to another embodiment, the received information on time unit transmission restrictions defines for which time units no grants are to be distributed by the BBU 110 of the first base station system 101 towards its RU 120.

According to another embodiment, when the information on time unit transmission restrictions reveals that no signals are to be sent in a certain time unit, the method further comprises: reconfiguring downlink transmission resources in that certain time unit into uplink transmission resources, and triggering sending of information on the reconfiguration towards wireless communication devices 140 connected to the RU 120 of the first base station system 101. Hereby, the wireless communication devices would not unnecessarily check the PDCCH, and thereby battery power is saved at the wireless communication devices. Also, such reconfiguration can be allowed to contradict transmission scheme requirements in TDD-base systems such as Orthogonal Frequency Division Multiplexing, OFDM, as the time units are anyhow not used for any sending as there are transmission restrictions in that time unit.

According to another embodiment, when the information on time unit transmission restrictions reveals that no signals are to be sent in a particular time unit, which time unit is set as downlink, the method further comprises reconfiguring a discontinuous reception, DRX, cycle for wireless communication devices 140 connected to the RU 120 so that the wireless communication devices 140 are informed that no signals are to be received at that particular time unit, and triggering sending of information on the reconfiguring to the wireless communication devices 140. As the wireless communication devices 140 can stay idle/asleep during that certain time unit thanks to the information on the reconfiguring, battery power of the wireless communication devices 140 is saved.

According to yet another embodiment, when the information on time unit transmission restrictions reveals that no signals are to be sent in a given time unit, which time unit is set as downlink, the method further comprises sending information on the time unit transmission restrictions for the given time unit to another base station that is not using the shared fronthaul connection. Hereby it is possible for a base station providing coverage to a neighboring cell but does not use the shared fronthaul connection to exploit such a given time unit over the air interface that is not used by the first base station. In other words, a radio resource that is not used due to the limitation in fronthaul can be used by another base station. For example, pilot signals with low interference can be sent by the neighboring base station in the given time unit towards its connected wireless communication devices.

According to yet another embodiment, the method further comprises obtaining 308 information on utilization of the allocated transmission resources, sending 310 the information on utilization of allocated transmission resources to the system 160 related to the wireless communication network, and receiving 312, from the system 160 related to the wireless communication network, information on adapted time unit transmission restrictions, in response to the sending 310 of the information on utilization. The method further comprises re-allocating 314 transmission resources according to the information on adapted time unit transmission restrictions, and triggering 316 communication of signals over the re-allocated transmission resources with wireless communication devices 140 connected to the RU of the first base station system 101, according to the re-allocation.

According to still another embodiment, the allocating 304 of transmission resources according to the information on time unit transmission restrictions comprises translating the time unit transmission restrictions into downlink or uplink formats for the respective transmission resource. In other words, the transmission resources should be set to UL or DL or possibly flexible, even if the transmission resource is not to be used according to the restrictions, this in order to be communication technology-compliant, e.g. NR or LTE compliant, as there are no "blanks" in NR or LTE.

Figure 4:
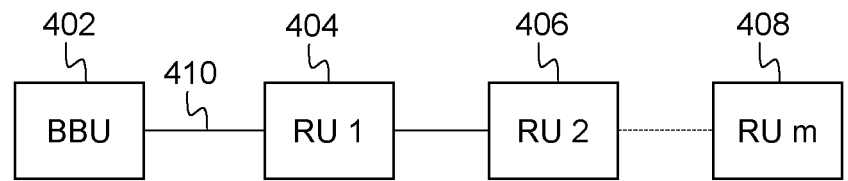
FIG. 4-5 are block diagrams illustrating other fronthaul configurations in which the present invention may be used.
Figure 5:
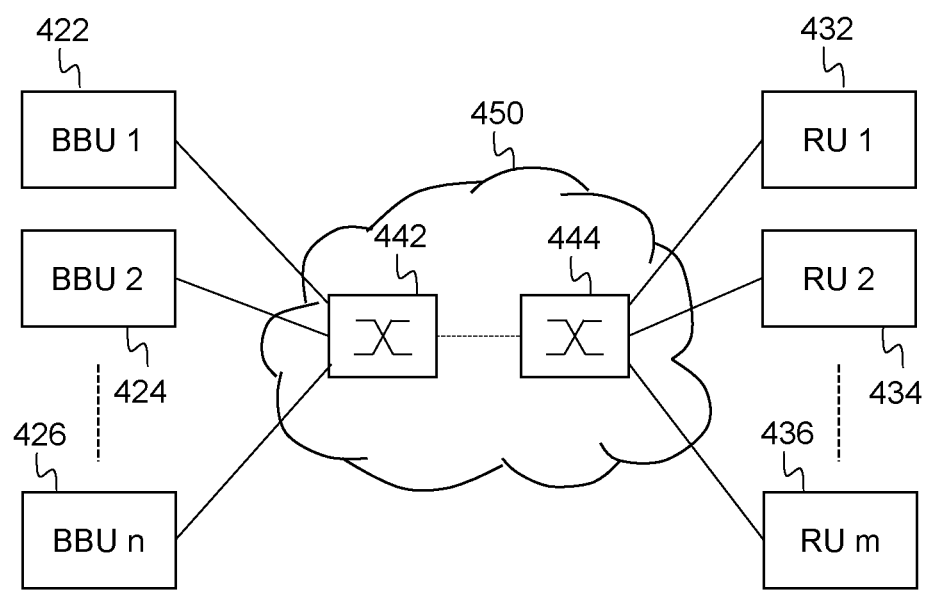

In the following, different embodiments of the invention are described. These embodiments relate to radio access networks using packet-based fronthaul, where the utilization of the fronthaul connections is proportional to that of the air interface, i.e. between the RU and its wireless communication devices. An example of such a radio access network is a network based on O-RAN, see "Control, User and Synchronization Plane Specification, ORAN-WG4.CUS.0-v01.00", from O-RAN Fronthaul Working Group, March 2019. The embodiments assume independent baseband and radio processing units, such as BBUs, and RUs. Each node in a BBU-RU pair executes a subset of RAN physical layer functions for at least one cell. FIGS. 4 and 5, as well as FIG. 1, show non-limiting examples of possible fronthaul networking topologies in which the embodiments can be used. FIG. 4 depicts a daisy-chain topology, where a BBU 402 is connected to a first RU 404 that in its turn is connected to a second RU 406 and so on towards an $m^{th}$ RU 408. In such a topology, the interface 410 between the BBU 402 and the first RU 404 is shared by all m RUs 404, 406, 408. FIG. 5 depicts a dumbbell-like topology where multiple BBUs 422, 424, 426 are connected to multiple RUs 432, 434, 436 via intermediate switching nodes 442, 444. The intermediate switching nodes 442, 444 may be part of a fronthaul network 450 that is shared for communication between the RUs 432, 434, 436 and the BBUs 422, 424, 426. The dashed line between the intermediate switching nodes 442, 444 represents a logical connection between nodes. The number of hops and nodes of the fronthaul network is not limited to what is shown in FIG. 5.

In these embodiments it is assumed that the radio access technology in use is NR and that the duplexing scheme is TDD or half-duplex FDD. As a consequence of this duplexing choice, the fronthaul traffic will also have TDD-like behavior, which means an alternating high- and low utilization pattern tied to the transmit direction in the air interface.

Considering traffic from a single cell, i.e. an RU providing radio coverage to a geographical area, prior to the start of a downlink OFDM symbol transmission, most fronthaul user plane packets will be flowing from BBU to RU nodes, while after the start of an uplink symbol, most user plane packets will be flowing from RU to BBU nodes. This happens because radio base stations connected to the same fronthaul connection should be synchronized to prevent inter-cell interference and connection drops during handover, among other requirements. The synchronization may be achieved through e.g. Precision Time Protocol (PTP).

The method proposed in these embodiments is based on the coordinated utilization of NR slot formats between cells that share a fronthaul connection. If cell A and cell B (see 122 and 127 of FIG. 1) "share" a fronthaul connection, traffic between nodes that implement PHY layer functionality for cell A (RU 120 and BBU 110 of FIG. 1) and traffic between nodes that implement PHY layer functionality for cell B (RU 125 and BBU 115) traverse said fronthaul connection.

In the next sections, embodiments of the invention are described, starting with the simplest way to coordinate slot format configuration, and work up to the full mechanism. But before doing that, slot formats and notations used in NR today, i.e. at the air interface, will be described and how they are used in this embodiment.

In NR, OFDM symbols in a slot can be designated downlink (d), uplink (u) or flexible (f). These classes are used to inform the UEs, for example, about when they can transmit and when they might receive scheduling grants and other control information from the gNodeBs they are connected to. Slot formats are 14 symbol sequences (e.g. dddd . . . ff . . . uuu) defining to which class each OFDM symbol in a slot belongs. Slot formats can be concatenated to form longer sequences specifying how consecutive slots are shared between transmit directions. In this embodiment, upper-case symbols (e.g. D, U, F, S) are used to indicate types of slot formats, i.e. what combination of OFDM symbol types a slot format contains. D (mostly downlink) is used to indicate a slot with at least one downlink and zero or more flexible symbols. Some examples include slot format types 0, 3, 4, 5, 6, 7, 16, 17, 18 as shown in 3GPP TS 38.213 V15.6.0, Section 11.1, Table 11.1.1-1 [1]. U (mostly uplink) is used to indicate a slot with at least one uplink and zero or more flexible symbols. Some examples include slot format types 1, 8, 9, 10, 11, 12, 13, 14, 15 in [1]. F (flexible) is used to indicate a slot with only flexible symbols. Some examples include slot format type 2 in [1]. S (switch) is used to indicate a slot with at least one downlink, at least one uplink and zero or more flexible symbols. Some examples include slot format types 16, 17, . . . , 32 in [1]. Slot configuration procedures, including slot format tables are described in 3GPP TS 38.213 V15.6.0, Section 11.1, pp. 83-91, and RRC messages related to slot format configuration are described in 3GPP TS 38.331 V15.6.0, pp. 363-365.

In order to avoid severe interference problems, RUs that are geographically close and use the same frequency band, or bands that overlap at least partly, may be configured in such a way that uplink and downlink transmissions do not occur simultaneously. This restriction may also be necessary, for example, because of coexistence requirements between NR and some other TDD technology. Coordination of slot format choices is a possible solution to surpass this problem. This is shown in "5G NR: The Next Generation Wireless Access Technology", by E. Dahlman et al, Academic Press, 2018, Section 7.8.1, pp. 121-123.

In the following, and according to embodiments, fronthaul sharing via restrictions of slot formats described above will be described. Suppose that a group of r base station system pairs share a fronthaul connection and implement the PHY layer functionality for cells $A_i$, with i=1, . . . , p. Each of the $A_i$ cells occupies carrier frequency $F_{ca}$. It is reasonable to assume that due to interference management concerns, the slot formats for each of the $A_i$ cells need to be harmonized, which means that simultaneous downlink-uplink transmissions shall not occur. For the sake of illustration, suppose that a harmonized transmission scheme consists of 5 slots that follow the sequence DDDUU. A harmonized transmission scheme can be defined as a restriction on slot formats imposed due to over-the-air coexistence and interference management requirements. Embodiments of this invention comprises restricting portions of the slot format sequence of the harmonized transmission scheme to be used by a subset of the $A_i$ cells in such a way that the aggregate of their fronthaul traffic is below a shared fronthaul connection capacity, while still respecting the harmonized transmission scheme.

An example of slot format restrictions of a harmonized transmission scheme is depicted in Table 1 below. Here it is assumed that nodes implementing cell $A_1$ and cell $A_2$ use the same carrier frequency $F_{ca}$ and share same part of a fronthaul network. Further, for dimensioning, the fronthaul network should be capable of sustaining 50% of peak cell throughput in both cells. In this case, the nodes implementing cells $A_1$ and $A_2$ are instructed to avoid each other in their fronthaul usage, while still maintaining compatibility to the harmonized transmission scheme over the air.

TABLE 1

| Harmonized transmission scheme for $F_{ca}$ | D | D | D | U | U |
|---|---|---|---|---|---|
| Restriction mask assigned to Cell $A_1$ | D | B | B | U | B |
| Restriction mask assigned to Cell $A_2$ | B | D | D | B | U |

Symbol D represents a downlink slot and symbol U represents an uplink slot. Symbol B represents a slot where cell $A_i$ does not distribute assignments or grants. The restrictions in Table 1, i.e. the B-symbols, may be communicated via an Operation and Maintenance (OAM) channel between a fronthaul controller and the nodes implementing cell $A_i$. If the harmonized transmission scheme and restriction masks of Table 1 are used for the network of FIG. 1, i.e. if cell 122 in FIG. 1 is cell $A_1$ in table 1 and cell 127 in FIG. 1 is cell $A_2$ in table 1, the first base station system 101 is assigned restriction mask DBBUB, and the second base station system 102 is assigned BDDBU. Hereby, only one base station at a time uses the shared fronthaul link and therefore maximum capacity of the fronthaul link is not exceeded.

Figure 6:
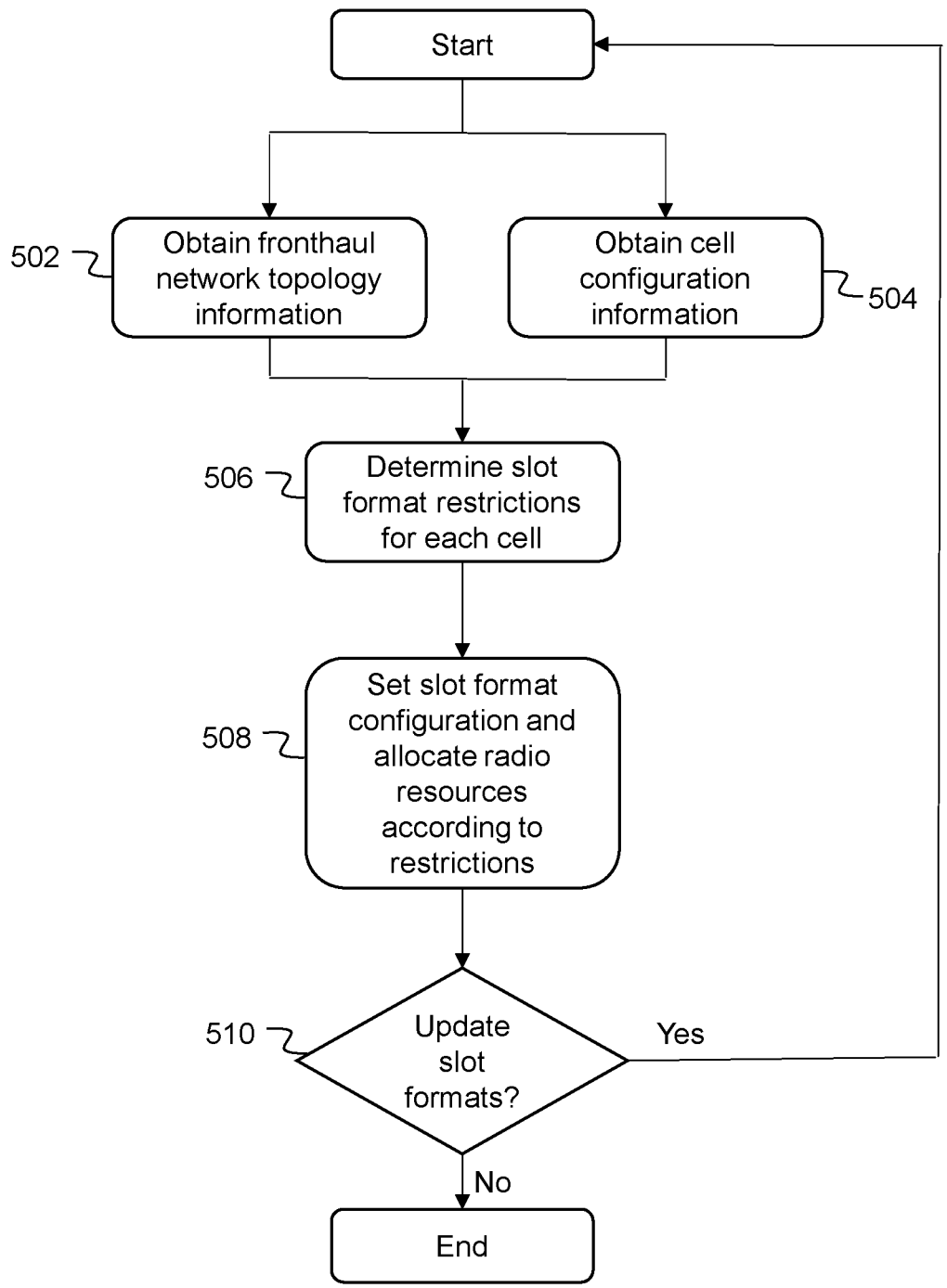
FIG. 6 is a flow chart illustrating embodiments of the invention.

FIG. 6 describes an embodiment of a method for optimizing usage of a shared fronthaul connection. A fronthaul controller obtains 502 fronthaul network topology information, including fronthaul capacity information of links of the fronthaul network connecting nodes of the fronthaul network, and possibly also a graph of the fronthaul network including its nodes and links, and routing information. The fronthaul network topology information may be made available to the fronthaul controller by a network management system. The fronthaul controller may be the system 160 shown in FIG. 1. The fronthaul controller further obtains 504 configuration information for each cell, i.e. base station system that shares the fronthaul network, or at least a link of the fronthaul network. The cell configuration information comprises information on required capacity for transmission and/or reception of wireless signals at the RU of each cell, such as information that can be used to determine peak air interface usage for a cell, such as bandwidth, carrier frequency, highest modulation order, harmonized transmission scheme requirements, maximum number of user layers, e.g. Multiple Input Multiple Output (MIMO) layers. From that peak, fronthaul usage for this cell can be determined. Alternatively, the fronthaul controller obtains a value on required capacity for UE communication for each cell directly. Based on the fronthaul network topology information and the configuration information for each cell, the fronthaul controller determines 506 a set of slot format restrictions for each cell involved, which restrictions results in a fronthaul usage below each fronthaul link's maximum capacity. The fronthaul controller thereafter signals the determined slot format restrictions to relevant nodes of each cell. The slot format restrictions may be signaled via existing OAM communication interfaces.

As mentioned, each cell is managed by a base station system comprising a BBU and an RU. The slot format restrictions for each cell signaled by the fronthaul controller are received in each respective BBU. The BBU of the cell that the slot format restriction concerns implement the restriction by modifying the cell slot format configuration according to the harmonized transmission scheme with the slot format restrictions. In other words, the BBU of each cell sets 508 slot format configuration and allocates radio resources according to the slot format restrictions. For example, when the fronthaul controller as slot format restrictions sends restriction masks such as the restriction masks shown in Table 1, the respective BBU modifies its respective slot formats and allocate radio resources to conform to blank slots B of the respective restriction mask. Observe that a restriction mask may also be on symbol level, i.e. so that a number of symbols of a slot are to be blank (b) but other symbols of the slot can be used for uplink or downlink communication (u or d) according to the harmonized transmission scheme.

The slot format restrictions may be updated, due to changes in network topology, radio equipment changes, changes in interference management requirements, cell usage statistics, quality of Service (QoS) requirements, etc. For this reason, the fronthaul controller checks 510 whether the slot formats need to be updated, and if so the method above is repeated.

The fronthaul controller mentioned above can be implemented as a node or set of nodes or a network function. The fronthaul controller can communicate the slot format restrictions with nodes implementing the target cells $A_i$, e.g. BBUs, using appropriate interfaces such as the Xn, F1 and E1 interfaces, or control plane messages in relevant fronthaul interfaces such as O-RAN and enhanced Common Public Radio Interface (eCPRI).

The output of step 506 is, according to an embodiment, a set of slot format usage restriction masks, whose purpose is the signaling of "blanking" periods during which grants and assignments is not to be distributed by cell $A_i$. Based on the slot format definitions in 3GPP TS 38.213 V15.6.0, Section 11.1, pp. 83-91 [2], the slot format usage restriction masks can be defined with symbol granularity. A blanking period of one OFDM symbol is denoted by a "b", while a full blank slot, i.e. 14 consecutive OFDM symbols, is denoted with "B". As an example, the restriction mask dddbbbbbbbbbbb consists of three downlink symbols followed by eleven symbols over which assignments shall not be distributed. The primary purpose of a slot format restriction mask is to control fronthaul resource utilization. The blanking periods signaled by the mask do not impose a transmit direction over the air. A few examples of slot formats that can be combined with the mask dddbbbbbbbbbbb are presented in Table 2. In Table 2, "sf" stands for slot format. Further, the sf-numbers mentioned refers to reference [2] above. The combination of transmission scheme, i.e. slot formats before the mask has been set, and mask determine over which scheduling procedure the blanking restriction will be active. In other words, if a blanking period coincides with a "d" symbol, assignments should not occur in that symbol. If they coincide with a "u", grants should not occupy that symbol. If a "b" and an "f" (i.e. flexible symbol) coincide, the "f" symbol shall be silent.

TABLE 2

| dddddddddddddd (sf. 0) | dddffffffffffuu (sf. 24) |
|---|---|
| dddfffffffffff (sf. 18) | dddffffffffuuu (sf. 27) |
| dddfffffffffu (sf. 21) | dddfuuuuuuuuuu (sf. 36) |

Slot format restriction masks may be defined with symbol granularity, slot granularity or a combination of both. Strings of concatenated masks may be produced, to cover the desired periodicity of the implementation. It should be clear to one skilled in the art that the masks may have multiple efficient representations, such as e.g. bit fields, and that the one disclosed here is chosen for clarity of exposition.

In the following, embodiments for calculating initial slot format restrictions are shown. For a given time granularity, e.g. symbols or slots, the initial restriction masks due to link/can be obtained as follows:

1. For each of the cells $A_i$ sharing the fronthaul link, obtain nominal peak fronthaul demand that could be demanded for that cell, e.g. number of subcarriers*maximum number of bits per symbol*maximum number of layers+beamforming coefficients and control plane overhead. Note that the values in this embodiment are derived from the cell configuration and not from "live" utilization.
2. If, assuming the values obtained in the previous step, the fronthaul capacity for link 1 is exceeded, introduce a restriction in one of the cells' slot format masks, and if necessary repeating step 1 and 2 until a feasible solution is found.
3. The number of available time-frequency transmission resources (symbols or slots) in uplink and downlink, respectively, should be distributed in such a way that some fairness criteria is met. As an example, the number of available transmission resources may be proportional to the peak nominal bitrate a cell can serve, e.g. macro cells with massive number of antennas should receive more resources than a cell having fewer antennas. Further, if external configurations would cause unequal usage of time-frequency resources, this unequal distribution could be captured with the slot format configuration.

According to an embodiment, the slot format restrictions may be updated over time. After an initial feasible set of slot format restriction masks has been distributed, the cells are allowed to operate, scheduling radio resources that respect slot format usage masks. In order to avoid suboptimal operation, the slot format restrictions may be updated, e.g. periodically, see step 510 of FIG. 6. One particular advantageous choice is to monitor the utilization of time-frequency resources of each of the $A_i$ cells. The cells with high utilization can then be prioritized. The utilization can be measured, for example, by the ratio of scheduled to schedulable resource blocks over a certain time interval for each cell. The update can be executed at a suitable rate, or based on defined thresholds. The update can be driven by live metrics collected by a subset of the nodes, e.g. BBUs. These metrics could either be reported to or queried by the fronthaul controller.

According to another embodiment, transmissions from non-interfering cell groups can be multiplexed over the fronthaul connection. Suppose that in addition to the group of cells $A_i$ the target fronthaul deployment supports a second set of cells $E_j$, j=1, . . . , q, with each cell $E_j$ occupying carrier frequency $F_{ce}$, which is different from carrier frequency $F_{ca}$ occupied by cells $A_i$. The slot formats for cells in the E group need to be harmonized, but not necessarily between groups A and E as they use different carrier frequencies. That is to say, if A and E are multiplexed in frequency over the air, their fronthaul usage in opposite transmit directions can be simultaneous. If non-interfering groups of cells are present, the fronthaul controller can take advantage of that to allow full duplex operation over the common fronthaul connection.

According to another embodiment, blanking periods, i.e. slots or symbols, may be exploited. As mentioned, when cell $A_i$'s slot format usage is restricted for a time period, e.g. a symbol or more, due to fronthaul limitations, grants and assignments shall not be placed in that time period. Such time periods, i.e. blanking periods (B) can be used by cell $A_i$'s implementing nodes in different ways.

According to a first alternative, if the slot format restriction mask imposes a blank period, said blank period can be configured, e.g. over the air, as either downlink, flexible or uplink, using traditional Radio Resource Control (RRC) interfaces, without violation of the harmonized transmission scheme. In other words, conditioned on some actions, the slot format configuration over-the-air can contradict the harmonized transmission scheme requirement during the blanking period without causing extra interference since there will be no transmission occupying the blank. For example, if a slot is marked as downlink in the harmonized transmission scheme, a blanking cell can configure that interval as uplink as long as it restricts opportunities for random access during the blank. That releases UEs from the need to check the Physical Downlink Control Channel (PDCCH) for control information, resulting in battery savings at the UEs.

According to a second alternative, if a blank is imposed in conjunction with a downlink or flexible symbol in the harmonized slot transmission scheme, the cell can:

1. Configure a DRX cycle of its UEs such that the UEs will not expect transmissions or inspect control channels during the blank. This saves UE battery;
2. Save power by turning a power amplifier (PA) of the RU off;
3. Communicate the blank to other cells. E.g. if the other cells are part of neighboring relationships for enhanced Inter-Cell Interference Coordination (eICIC). This would allow neighboring cells to exploit the blank to transmit pilots with low interference, among other uses.

According to a third alternative, if a blank is imposed in uplink, the cell can choose to restrict opportunities for random access and allow for energy savings in its implementing nodes, i.e. in the RU and/or the BBU.

In the following, an example will be described to illustrate proposed embodiments. Consider a fronthaul network shared by cells $A_1$, $A_2$ and $A_3$, implemented by BBU-RU pairs. For the purposes of this example, the network can be abstracted as a simple dumbbell topology, with a single link between two switches being the only path between BBU nodes on one side and RU nodes on the other side of the bottleneck, as in FIG. 5. As a result of cell planning and neighboring base stations, the harmonized transmission scheme is DDDUU. A usual rule of thumb to dimension the fronthaul network is to provision half of the simultaneous peak rate, i.e. 0.5*sum of peak demand from cells sharing the fronthaul network. Adding some numbers to the example, consider the bottleneck link dimensioning as: C=(0.5*3no. of cells*8 layers*25 RBs per layer*12 subcarriers per RB*6 bits per 64 QAM constellation index*14 OFDM symbols per slot*1000 slots per second)=302.4 Mbps. This roughly corresponds to the capacity of an illustrative bottleneck fronthaul link. The bandwidth of 5 MHz, which means 25 RBs, and 8 number of user layers chosen is used here only for sake of simplicity. However, the results can be scaled arbitrarily. With the dimensioning rule of thumb described above, or any other not covering the absolute peak fronthaul demand, it is possible that fluctuations in demand could temporarily overload this network, causing unwanted congestion. Consider the case that in the first three slots, which are downlink slots, $A_1$ is always at peak usage (DDD) and $A_2$ and $A_3$ are at ⅔ peak (DDX), where "X" means a slot without assignments or grants. However, in a particularly busy slot, $A_3$ happens to have extra demand. Then the following situation occurs:

TABLE 3

| | FH rate (Mbps) | |
| --- | --- | --- |
| | DL | UL |
| $A_1$ DDDUU | 120.96 | 80.64 |
| $A_2$ DDXUU | 80.64 | 80.64 |
| $A_3$ DDDUU | 120.96 | 80.64 |
| air DDDUU | 322.56 | 241.92 |

The total demand is as shown in Table 3, 322 Mbps in the particularly busy slot, but as the fronthaul capacity is 302 Mbps, a congestion state may occur. Since a congestion state can be difficult to recover from, it is useful to limit the cell's peak usage to respect the fronthaul limitations. Because there are no cell-specific restrictions so far, the fronthaul controller according to embodiments calculates such restrictions. The restrictions may be applied as equal-share allocation and realized in several ways, out of which four possible options are shown in Table 4 below:

TABLE 4

| | FH rate (Mbps) | |
| --- | --- | --- |
| | DL | UL |
| (1) $A_1$ DDBUU | 80.64 | 80.64 |
| $A_2$ DDBUU | 80.64 | 80.64 |
| $A_3$ DDBUU | 80.64 | 80.64 |
| air DDXUU | 241.92 | 241.92 |
| (2) $A_1$ DBBUB DBBBB DBBBU | 40.32 | 26.88 |
| $A_2$ BDBBU BDBBU BDBBB | 40.32 | 26.88 |
| $A_3$ BBDBB BBDUB BBDUB | 40.32 | 26.88 |
| air DDDUU DDDUU DDDUU | 120.96 | 80.64 |
| (3) $A_1$ DDBUU BBDBB BDDBU | 67.20 | 40.32 |
| $A_2$ BDDBU DDBUU BBDBB | 67.20 | 40.32 |
| $A_3$ BBDBB BDDBU DDBUU | 67.20 | 40.32 |
| air DDDUU DDDUU DDDUU | 201.60 | 120.96 |
| (4) $A_1$ DBBUB DBBBB DBBUB | 40.32 | 26.88 |
| $A_2$ DBBUB DBBUB DBBBB | 40.32 | 26.88 |
| $A_3$ DBBBB DBBUB DBBUB | 40.32 | 26.88 |
| air DXXUX DXXUX DXXUX | 120.96 | 80.64 |

An equal share allocation could be that the time unit transmission restrictions for the first base stations system 101 and the time unit transmission restrictions for the second base station system 102 are mutually distributed so that available transmission resources for the first base station system and available transmission resources for the second base station system are proportional to the required capacity for transmission and/or reception of wireless signals by the first base station system 101 and the required capacity for transmission and/or reception of wireless signals by the second base station system 102. Note that in some cases, e.g. options (2)-(4) above, a longer sequence of slot formats was necessary to respect the harmonized transmission scheme. For simplicity, suppose option (2) above was chosen. In the Xn interface, the cells can communicate with each other, via e.g. Load Management messages, their current and/or predicted load for the near future. In this example, suppose cell $A_3$ informs a predicted increase in usage, while the fronthaul controller can observe that cell $A_2$'s load has been consistently below average.

With this input, the fronthaul controller can reallocate some of $A_2$'s resources to $A_3$, as shown in Table 5 below. It is straightforward to obtain a non-equal allocation with this scheme as well.

TABLE 5

| | FH rate (Mbps) | |
| --- | --- | --- |
| | DL | UL |
| $A_1$ DBBUB DBBBB DBBBU | 40.32 | 26.88 |
| $A_2$ BBBBU BDBBU BDBBB | 26.88 | 26.88 |
| $A_3$ BDDBB BBDUB BBDUB | 53.76 | 26.88 |
| air DDDUU DDDUU DDDUU | 120.96 | 80.64 |

By the methods, systems and BBUs described in this disclosure, a way is provided for the wireless communication network including the base station systems to respect fronthaul network limitations without introducing awareness of the state of the fronthaul network in the scheduler: the latter is merely constrained by how many assignments, or grants, it can distribute. This is achieved while respecting the harmonized transmission scheme over the air. Note that while the examples describe full slot limitations it is also possible to get finer granularity by restricting usage on an OFDM symbol basis.

Figure 7:
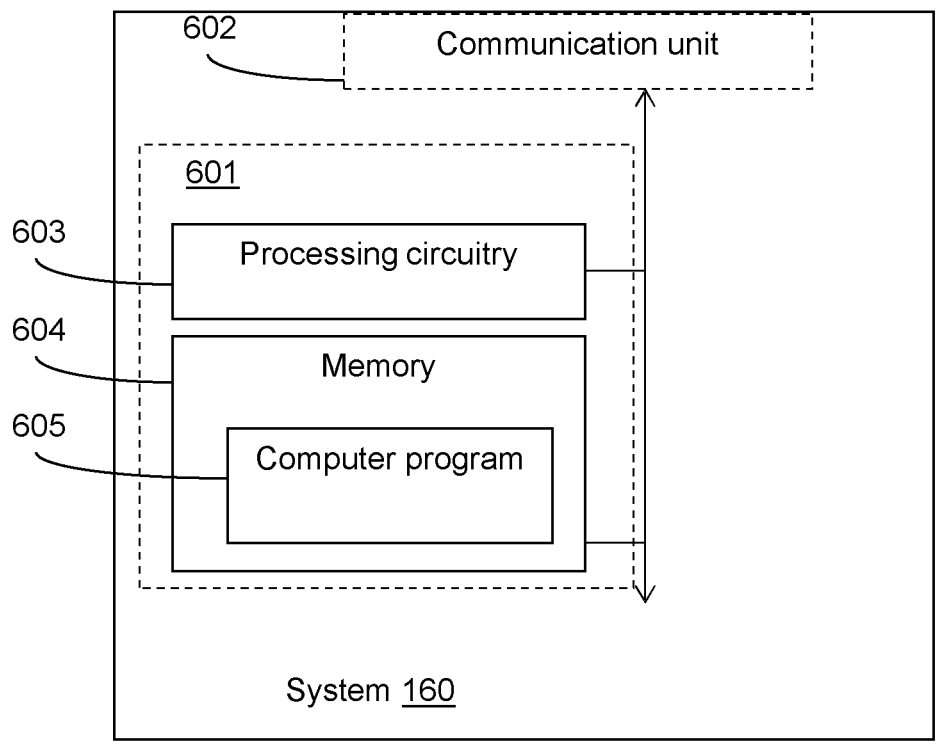
FIG. 7 is a block diagram illustrating a system in more detail, according to further possible embodiments.

FIG. 7, in conjunction with FIG. 1, shows a system 160 configured for a wireless communication network comprising a plurality of base station systems 101, 102. Each base station system comprises a BBU 110, 115 and an RU 120, 125 interconnected via a fronthaul connection 130. The RUs 120, 125 are arranged to transmit wireless signals to, and receive from, wireless communication devices 140, 145. The system 160 comprises a processing circuitry 603 and a memory 604. Said memory contains instructions executable by said processing circuitry, whereby the system 160 is operative for obtaining fronthaul capacity information on transmission capacity of a part of the fronthaul connection 130 that is shared by a first base station system 101 and a second base station system 102 of the plurality of base station systems, and obtaining information on required capacity for transmission and/or reception of wireless signals by the RU 120 of the first base station system 101 and by the RU 125 of the second base station system 102 towards and/or from the wireless communication devices 140, 145. The system is further operative for determining time unit transmission restrictions for the first base station system 101 and for the second base station system 102 based on the obtained fronthaul capacity information and on the obtained information on required capacity, which time unit transmission restrictions results in fronthaul usage below the transmission capacity of the part of the fronthaul connection, and sending information on the determined time unit transmission restrictions for the first base station system to the BBU of the first base station system and information on the determined time unit transmission restrictions for the second base station system to the BBU of the second base station system.

The system 160 may be called a fronthaul controller. The fronthaul controller could be situated anywhere inside or outside the wireless communication network. According to one embodiment, the fronthaul controller is situated close to any of the BBUs, or even in one of the BBUs in order to be able to perform fast instructions. Alternatively, the fronthaul controller may be realized as a group of network nodes, wherein functionality of the fronthaul controller is spread out over different physical, or virtual, nodes, a so called cloud-solution.

According to an embodiment, the determined time unit transmission restrictions comprises a first mask defining at which time units no data is to be sent between the BBU 110 of the first base station system 101 and its RU 120 and a second mask defining at which time units no data is to be sent between the BBU 115 of the second base station system 102 and its RU 125. Further, the information that the system is operable for sending to the BBU 110 of the first base station system 101 is the first mask and the information that the system is operable for sending to the BBU 115 of the second base station system 102 is the second mask.

According to another embodiment, the system is further operative for, for time units that are configured as uplink time units: initiating sending of the determined time unit transmission restrictions for the first base station system to the RU 120 of the first base station system 101, and initiating sending of the determined time unit transmission restrictions for the second base station system to the RU 125 of the second base station system 102.

According to another embodiment, the time unit transmission restrictions define for which time units no grants are to be distributed by the BBU 110 of the first base station system 101 towards its RU 120 and for which time units no grants are to be distributed by the BBU 115 of the second base station system 102 towards its RU 125.

According to another embodiment, the time unit transmission restrictions for the first base stations system 101 and the time unit transmission restrictions for the second base station system 102 are mutually distributed so that available transmission resources for the first base station system and available transmission resources for the second base station system are proportional to the required capacity for transmission and/or reception of wireless signals by the first base station system 101 and the required capacity for transmission and/or reception of wireless signals by the second base station system 102.

According to another embodiment, the system is further operative for obtaining information on utilization of transmission resources of the first base station system and information on utilization of transmission resources of the second base station system when the determined time unit restrictions of the first and the second base station system are used, and for adapting the determined time unit transmission restrictions of the first base station system and the time unit transmission restrictions of the second base station system to the obtained information on utilization of transmission resources of the first base station system and information on utilization of transmission resources of the second base station system. Further, the system is operative for sending information on the respective adapted time unit transmission restriction to the respective one of the first and the second base station system.

According to other embodiments, the system 160 may further comprise a communication unit 602, which may be considered to comprise conventional means for communication with the BBUs of the first and second base station system as well as with other base stations or base station systems. The instructions executable by said processing circuitry 603 may be arranged as a computer program 605 stored e.g. in said memory 604. The processing circuitry 603 and the memory 604 may be arranged in a sub-arrangement 601. The sub-arrangement 601 may be a micro-processor and adequate software and storage therefore, a Programmable Logic Device, PLD, or other electronic component(s)/processing circuit(s) configured to perform the methods mentioned above. The processing circuitry 603 may comprise one or more programmable processor, application-specific integrated circuits, field programmable gate arrays or combinations of these adapted to execute instructions.

The computer program 605 may be arranged such that when its instructions are run in the processing circuitry, they cause the system 160 to perform the steps described in any of the described embodiments of the system 160 and its method. The computer program 605 may be carried by a computer program product connectable to the processing circuitry 603. The computer program product may be the memory 604, or at least arranged in the memory. The memory 604 may be realized as for example a RAM (Random-access memory), ROM (Read-Only Memory) or an EEPROM (Electrical Erasable Programmable ROM). Further, the computer program 605 may be carried by a separate computer-readable medium, such as a CD, DVD or flash memory, from which the program could be downloaded into the memory 604. Alternatively, the computer program may be stored on a server or any other entity to which the system 160 has access via the communication unit 602. The computer program 605 may then be downloaded from the server into the memory 604.

Figure 8:
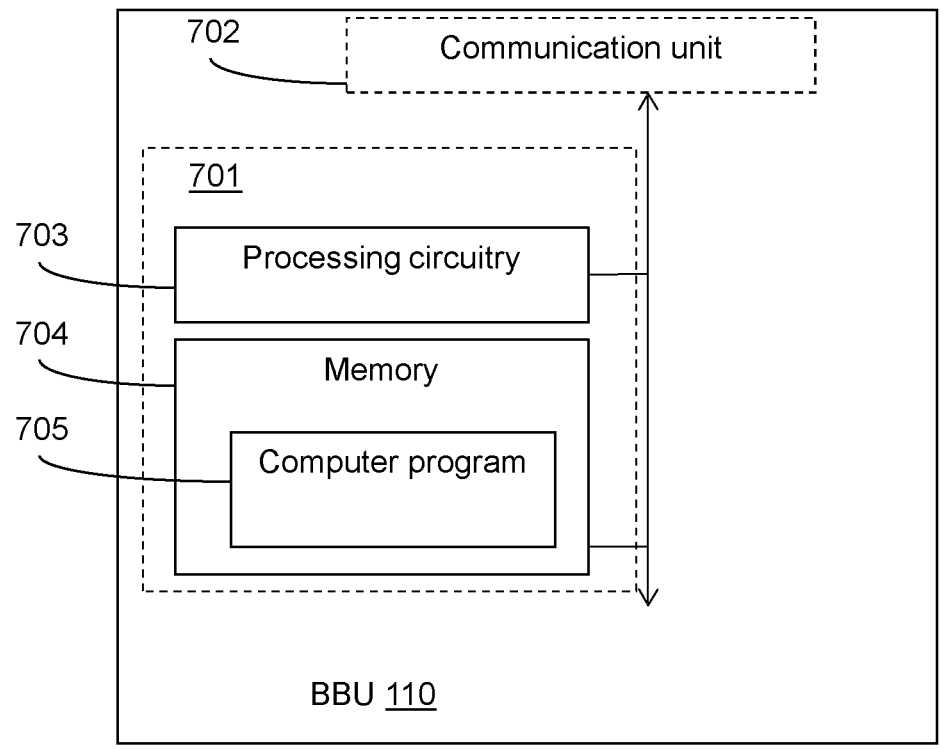
FIG. 8 is a block diagram illustrating a BBU in more detail, according to further possible embodiments.

FIG. 8, in conjunction with FIG. 1, shows a BBU 110 operable in a first base station system 101 of a wireless communication network, the first base station system 101 further comprising an RU 120. Further, the wireless communication network comprises a second base station system comprising an RU and a BBU. The BBUs and the RUs of each base station system are interconnected via a fronthaul connection 130. The fronthaul connection is shared by the first and the second base station system. The BBU 110 comprises a processing circuitry 703 and a memory 704. Said memory contains instructions executable by said processing circuitry, whereby the BBU 110 is operative for receiving, from a system 160 related to the wireless communication network, information on time unit transmission restrictions for the first base station system 101, the time unit transmission restrictions being determined based on fronthaul capacity information on the shared fronthaul connection and on information on required capacity for transmission and/or reception of wireless signals by the RU 120 of the first base station system 101 and by the RU of the second base station system 102. The BBU is further operative for allocating transmission resources according to the information on time unit transmission restrictions. and for triggering communication of signals over the allocated transmission resources with wireless communication devices 140 connected to the RU of the first base station system 101, according to the allocation.

According to an embodiment, the received information on time unit transmission restrictions defines for which time units no grants are to be distributed by the BBU 110 of the first base station system 101 towards its RU 120.

According to another embodiment, when the information on time unit transmission restrictions reveals that no signals are to be sent in a certain time unit, the BBU is operative for reconfiguring downlink transmission resources in that certain time unit into uplink transmission resources, and for triggering sending of information on the reconfiguration towards wireless communication devices 140 connected to the RU 120 of the first base station system 101.

According to another embodiment, when the information on time unit transmission restrictions reveals that no signals are to be sent in a particular time unit, which time unit is set as downlink, the BBU is operative for reconfiguring a DRX cycle for wireless communication devices 140 connected to the RU 120 so that the wireless communication devices 140 are informed that no signals are to be received at that particular time unit, and for triggering sending of information on the reconfiguring to the wireless communication devices 140.

According to another embodiment, when the information on time unit transmission restrictions reveals that no signals are to be sent in a given time unit, which time unit is set as downlink, the BBU is operative for sending information on the time unit transmission restrictions of the given time unit to another base station system that is not using the shared fronthaul connection.

According to other embodiments, the BBU 110 may further comprise a communication unit 702, which may be considered to comprise conventional means for communication with the system 160 as well as with the RU 120. The instructions executable by said processing circuitry 703 may be arranged as a computer program 705 stored e.g. in said memory 704. The processing circuitry 703 and the memory 704 may be arranged in a sub-arrangement 701. The sub-arrangement 701 may be a micro-processor and adequate software and storage therefore, a Programmable Logic Device, PLD, or other electronic component(s)/processing circuit(s) configured to perform the methods mentioned above. The processing circuitry 703 may comprise one or more programmable processor, application-specific integrated circuits, field programmable gate arrays or combinations of these adapted to execute instructions.

The computer program 705 may be arranged such that when its instructions are run in the processing circuitry, they cause the BBU 110 to perform the steps described in any of the described embodiments of the BBU 110 and its method. The computer program 705 may be carried by a computer program product connectable to the processing circuitry 703. The computer program product may be the memory 704, or at least arranged in the memory. The memory 704 may be realized as for example a RAM (Random-access memory), ROM (Read-Only Memory) or an EEPROM (Electrical Erasable Programmable ROM). Further, the computer program 705 may be carried by a separate computer-readable medium, such as a CD, DVD or flash memory, from which the program could be downloaded into the memory 704. Alternatively, the computer program may be stored on a server or any other entity to which the BBU 110 has access via the communication unit 702. The computer program 705 may then be downloaded from the server into the memory 704.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method performed by a system related to a wireless communication network comprising a plurality of base station systems, each base station system comprising a baseband unit, BBU and a radio unit, RU interconnected via a fronthaul connection, the RUs being arranged to transmit wireless signals to, and receive from, wireless communication devices, the method comprising:
obtaining fronthaul capacity information on transmission capacity of a part of the fronthaul connection that is shared by a first base station system and a second base station system of the plurality of base station systems;
obtaining information on required capacity for at least one of transmission and reception of wireless signals by the RU of the first base station system and by the RU of the second base station system at least one of towards and from the wireless communication devices;
determining time unit transmission restrictions for the first base station system and for the second base station system based on the obtained fronthaul capacity information and on the obtained information on required capacity, which time unit transmission restrictions results in fronthaul usage below the transmission capacity of the part of the fronthaul connection, the determined time unit transmission restrictions comprising a first mask defining at which time units no data is to be sent between the BBU of the first base station system and its RU and a second mask defining at which time units no data is to be sent between the BBU of the second base station system and its RU, and the information sent to the BBU of the first base station system being the first mask and the information sent to the BBU of the second base station system being the second mask; and
sending information on the determined time unit transmission restrictions for the first base station system to the BBU of the first base station system and information on the determined time unit transmission restrictions for the second base station system to the BBU of the second base station system.

2. The method according to claim 1, further comprising, for time units that are configured as uplink time units:
initiating sending of the determined time unit transmission restrictions for the first base station system to the RU of the first base station system and initiating sending of the determined time unit transmission restrictions for the second base station system to the RU of the second base station system.

3. The method according to claim 1, wherein the determined time unit transmission restrictions defines for which time units no grants are to be distributed by the BBU of the first base station system towards its RU and for which time units no grants are to be distributed by the BBU of the second base station system towards its RU.

4. The method according to claim 1, wherein the time unit transmission restrictions for the first base stations system and the time unit transmission restrictions for the second base station system are mutually distributed so that available transmission resources for the first base station system and available transmission resources for the second base station system are proportional to the required capacity for at least one of transmission and reception of wireless signals by the first base station system and the required capacity for at least one of transmission and reception of wireless signals by the second base station system.

5. The method according to claim 1, further comprising:
obtaining information on utilization of transmission resources of the first base station system and information on utilization of transmission resources of the second base station system when the determined time unit restrictions of the first and the second base station system are used;
adapting the determined time unit transmission restrictions of the first base station system and the time unit transmission restrictions of the second base station system to the obtained information on utilization of transmission resources of the first base station system and information on utilization of transmission resources of the second base station system; and
sending information on the respective adapted time unit transmission restriction to the respective one of the first and the second base station system.

6. The method according to claim 1, wherein also a third base station system shares the part of the fronthaul connection, the first and the second base station systems communicating over a first carrier frequency band and the third base station system communicating over a second carrier frequency band that is different from the first carrier frequency band, the method further comprising:
instructing the third base station system to communicate signals with its wireless communication devices in the same time units as signals are communicated by one of the first base station system and the second base station system but in an opposite direction as a direction in which the signals are communicated by the one of the first base station system and the second base station system.

7. A method performed by a base band unit, BBU, of a first base station system of a wireless communication network, the first base station system further comprising a radio unit, RU, and the wireless communication network further comprising a second base station system comprising an RU and a BBU, the BBUs and the RUs of each of the first and second base station system being interconnected via a fronthaul connection, the fronthaul connection being shared by the first and the second base station system, the method comprising:
receiving, from a system related to the wireless communication network, information on time unit transmission restrictions for the first base station system determined based on fronthaul capacity information on the shared fronthaul connection and on information on required capacity for at least one of transmission and reception of wireless signals by the RU of the first base station system and by the RU of the second base station system, the information on time unit transmission restrictions comprising a first mask defining at which time units no data is to be distributed between the BBU of the first base station system and its RU;
allocating transmission resources according to the information on time unit transmission restrictions; and
triggering communication of signals over the allocated transmission resources with wireless communication devices connected to the RU of the first base station system according to the allocation.

8. The method according to claim 7, wherein the received information on time unit transmission restrictions defines for which time units no grants are to be distributed by the BBU of the first base station system towards its RU.

9. The method according to claim 7, wherein when the information on time unit transmission restrictions reveals that no signals are to be sent in a certain time unit, the method further comprises:
reconfiguring downlink transmission resources in the certain time unit into uplink transmission resources; and
triggering sending of information on the reconfiguration towards wireless communication devices connected to the RU of the first base station system.

10. The method according to claim 7, wherein when the information on time unit transmission restrictions reveals that no signals are to be sent in a particular time unit, which time unit is set as downlink, the method further comprises:
reconfiguring a DRX cycle for wireless communication devices connected to the RU so that the wireless communication devices are informed that no signals are to be received at that particular time unit; and
triggering sending of information on the reconfiguring to the wireless communication devices.

11. The method according to claim 7, wherein when the information on time unit transmission restrictions reveals that no signals are to be sent in a given time unit, which time unit is set as downlink, sending information on the time unit transmission restrictions of the given time unit to another base station system that is not using the shared fronthaul connection.

12. The method according to claim 7, further comprising:
obtaining information on utilization of the allocated transmission resources;
sending the information on utilization of allocated transmission resources to the system related to the wireless communication network;
receiving, from the system related to the wireless communication network, information on adapted time unit transmission restrictions, in response to the sending of the information on utilization;
re-allocating transmission resources according to the information on adapted time unit transmission restrictions; and
triggering communication of signals over the re-allocated transmission resources with wireless communication devices connected to the RU of the first base station system, according to the re-allocation.

13. The method according to claim 7, wherein the allocating of transmission resources according to the information on time unit transmission restrictions comprises translating the time unit transmission restrictions into one of downlink and uplink formats for the respective transmission resource.

14. A system configured for a wireless communication network comprising a plurality of base station systems, each base station system comprising a baseband unit, BBU and a radio unit, RU interconnected via a fronthaul connection, the RUS being arranged to transmit wireless signals to, and receive from, wireless communication devices, the system comprising a processing circuitry and a memory, the memory containing instructions executable by the processing circuitry to configure the processing circuitry for:
obtaining fronthaul capacity information on transmission capacity of a part of the fronthaul connection that is shared by a first base station system and a second base station system of the plurality of base station systems;
obtaining information on required capacity for at least one of transmission and reception of wireless signals by the RU of the first base station system and by the RU of the second base station system at least one of towards and from the wireless communication devices;

determining time unit transmission restrictions for the first base station system and for the second base station system based on the obtained fronthaul capacity information and on the obtained information on required capacity, which time unit transmission restrictions results in fronthaul usage below the transmission capacity of the part of the fronthaul connection, the determined time unit transmission restrictions comprising a first mask defining at which time units no data is to be sent between the BBU of the first base station system and its RU and a second mask defining at which time units no data is to be sent between the BBU of the second base station system and its RU, and the information sent to the BBU of the first base station system being the first mask and the information sent to the BBU of the second base station system being the second mask; and sending information on the determined time unit transmission restrictions for the first base station system to the BBU of the first base station system and information on the determined time unit transmission restrictions for the second base station system to the BBU of the second base station system.

15. A computer program stored in a non-transitory computer readable medium comprising instructions, which, when executed by at least one processing circuitry of a system related to a wireless communication network, causes the system to perform a method comprising: obtaining fronthaul capacity information on transmission capacity of a part of a fronthaul connection that is shared by a first base station system and a second base station system;

obtaining information on required capacity for at least one of transmission and reception of wireless signals by an RU of the first base station system and by an RU of the second base station system at least one of towards and from wireless communication devices;

determining time unit transmission restrictions for the first base station system and for the second base station system based on the obtained fronthaul capacity information and on the obtained information on required capacity, which time unit transmission restrictions results in fronthaul usage below the transmission capacity of the part of the fronthaul connection, the determined time unit transmission restrictions comprising a first mask defining at which time units no data is to be sent between a BBU of the first base station system and its RU and a second mask defining at which time units no data is to be sent between a BBU of the second base station system and its RU, and the information sent to the BBU of the first base station system being the first mask and the information sent to the BBU of the second base station system being the second mask; and sending information on the determined time unit transmission restrictions for the first base station system to the BBU of the first base station system and information on the determined time unit transmission restrictions for the second base station system to the BBU of the second base station system.

16. A base band unit, BBU, operable in a first base station system of a wireless communication network, the first base station system further comprising a radio unit, RU, and the wireless communication network further comprising a second base station system comprising an RU and a BBU, the BBUs and the RUs of each base station system being interconnected via a fronthaul connection, the fronthaul connection being shared by the first and the second base station system, the BBU comprising a processing circuitry and a memory, the memory containing instructions executable by the processing circuitry to configure the processing circuitry for:

receiving, from a system related to the wireless communication network, information on time unit transmission restrictions for the first base station system determined based on fronthaul capacity information on the shared fronthaul connection and on information on required capacity for at least one of transmission and reception of wireless signals by the RU of the first base station system and by the RU of the second base station system, the information on time unit transmission restrictions comprising a first mask defining at which time units no data is to be distributed between the BBU of the first base station system and its RU;

allocating transmission resources according to the information on time unit transmission restrictions; and triggering communication of signals over the allocated transmission resources with wireless communication devices connected to the RU of the first base station system, according to the allocation.

17. The BBU according to claim 16, wherein when the information on time unit transmission restrictions reveals that no signals are to be sent in a certain time unit, the processing circuitry is further configured for:

reconfiguring downlink transmission resources in the certain time unit into uplink transmission resources, and triggering sending of information on the reconfiguration towards wireless communication devices connected to the RU of the first base station system.

* * * * *